No. 799,290. PATENTED SEPT. 12, 1905.
W. S. AUSTIN.
VARIABLE SPEED AND REVERSING GEAR.
APPLICATION FILED AUG. 17, 1903.
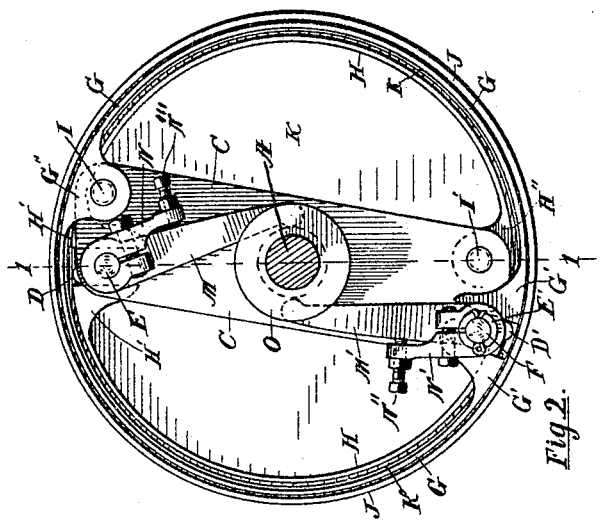
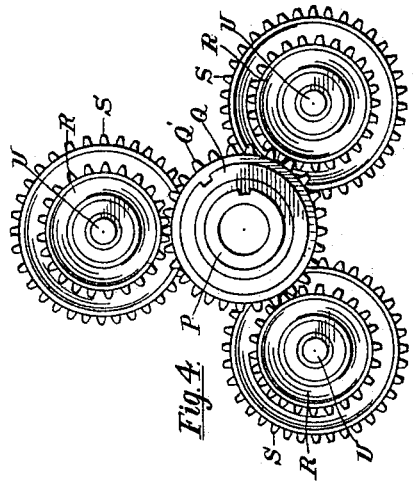
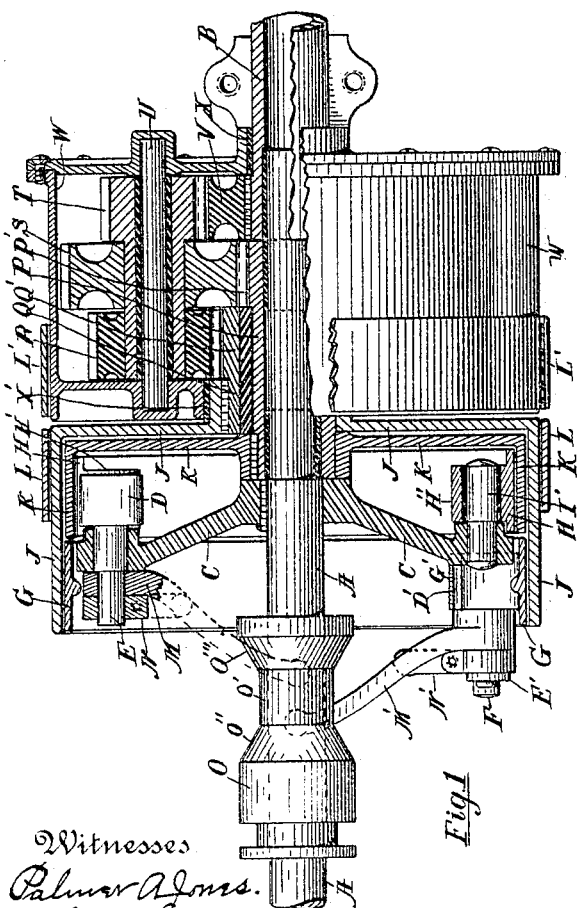
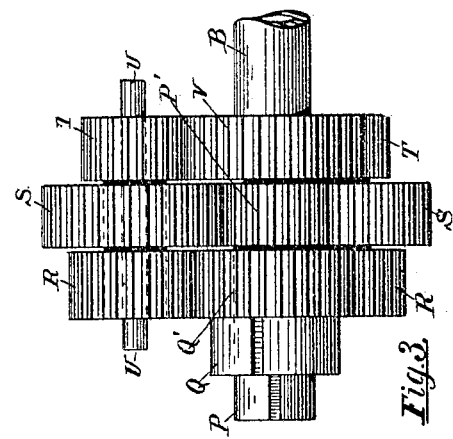
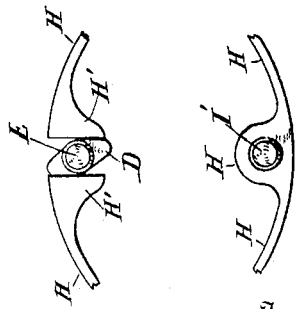
Witnesses
Palmer A. Jones.
Georgiana Chase
Inventor
Walter S. Austin
By Luther V. Moulton
Attorney

UNITED STATES PATENT OFFICE.

WALTER S. AUSTIN, OF GRAND RAPIDS, MICHIGAN.

VARIABLE-SPEED AND REVERSING GEAR.

No. 799,290.  Specification of Letters Patent.  Patented Sept. 12, 1905.

Application filed August 17, 1903. Serial No. 169,695.

*To all whom it may concern:*

Be it known that I, WALTER S. AUSTIN, a citizen of the United States, residing at Grand Rapids, in the county of Kent and State of Michigan, have invented certain new and useful Improvements in Variable-Speed and Reversing Gears; and I do hereby declare the following to be a full, clear, and exact description of the invention, such as will enable others skilled in the art to which it appertains to make and use the same.

My invention relates to improvements in variable-speed and reversing gears, and more particularly to improvements in the device shown in my Patent No. 725,812, dated April 21, 1903; and its object is to provide means whereby the intermediate speed and the back-up speed may be properly proportioned, to provide means for detaching the gears from the driving-shaft when the driven member is at rest, and to provide the device with certain new and useful features, hereinafter more fully described, and particularly pointed out in the claims.

In the device shown in my patent previously referred to a single driving-gear is alternately connected to the several driven gears and any change in the proportions by which the intermediate speed is increased or decreased the speed of the back-up movement is increased or decreased in like manner, the result being that any proportion giving a satisfactory intermediate speed necessitates a too high back-up speed. In the improvement shown herein several driving-gears are alternately connected to a single driven gear, whereby an increase or decrease of the intermediate speed operates to oppositely change the speed of the back-up movement. I am thus enabled to so proportion the gears as to get a satisfactory intermediate speed and at the same time get a satisfactory back-up speed. Furthermore, in the construction shown in said patent when the driven member is detached and idle the gears remain connected to the driving member and are rotated thereby, whereas in the construction herein shown when the driven member is idle the gears are all detached from the driving member and are not rotated thereby. Various other incidental advantages will also appear.

My invention consists, essentially, in the combination of two concentric and independently-rotative sleeves, each having a pinion and a clutch member fixed thereon, corresponding clutch members on the driving-shaft, means for alternately or simultaneously engaging said clutches at pleasure, means for holding one of said sleeves from turning, a driven member having a gear thereon, a series of rigidly-attached planet-gears engaging the pinions on the sleeves and the gear on the driven member, and means for preventing the rotation of the planet-gears around the axis of the other gears, as will hereinafter more fully appear by reference to the accompanying drawings, in which—

Figure 1 is a side elevation, shown partly in section on the line 1 1 of Fig. 2, of a device embodying my invention; Fig. 2, an end elevation of the same; Fig. 3, a detail of the gears and sleeves in side elevation; Fig. 4, an end elevation of the same, and Fig. 5 a detail of one of the driving-rings of the clutches.

Like letters refer to like parts in all of the figures.

A represents the driving-shaft, having a constant rotary motion by means of any suitable motor; B, the driven member, arranged in line with the driving-shaft and having thereon a driven gear V, engaged and driven by one or more planet-gears T. To drive the planet-gears T, I provide for each of the same two other gears R and S in axial alinement therewith and rigidly attached thereto, thus forming a series of three rigidly-attached gears R, S, and T, mounted on a common axis U. Any convenient number of series of planet-gears, preferably three, are employed, with their axles U mounted in a suitable case W, said case being rotative about the axis of the driving-shaft and driven member. Engaging the planet-gear S is a pinion P', fixed on a sleeve P. Independently rotative about the axis of the driving-shaft and engaging the gear R is a pinion Q', fixed on an outer sleeve Q, also independently rotative about said axis. Attached to the outer sleeve Q is the outer cup-shaped member J of a friction-clutch, whereby the sleeve is driven from the driving-shaft A, and attached to the inner sleeve is an inner cup-shaped friction-clutch member K, whereby the inner sleeve is also driven from the driving-shaft A. The driving-clutch members consist of expansion-rings G and H, engaging the respective clutch members J and K, which rings are mounted on a spider C, keyed to the shaft A, whereby the spider carries and rotates said friction-rings, as hereinafter described. The outer clutch member J is held from rotation when occasion requires by a suitable brake-band L, surrounding the same and operated in the usual manner. (Not shown.) The case W is journaled at X and X' and is held from rotation when occasion requires by a similar brake-band L', operated in any convenient manner. The inner clutch member and parts operated thereby are driven by the expansion-ring H, connected at one side by a perforated lug H'' to a pin I', projecting inward from one arm of the spider C. Said ring is divided at the opposite side and provided with inwardly-projecting parallel lugs H', between which lugs is a cam D, having a stud E journaled in the other arm of the spider C. Upon this stud is journaled an operating-lever M, and on the outer end of said stud is fixed an arm N, having a set-screw N''' engaging the lever M to adjust the cam D to take up the wear of the ring H. The outer sleeve and its clutch member J are driven by a similar expansion-ring G, in like manner attached to one arm of the spider C by a lug G'' and pin I and operated in like manner by being divided and having inwardly-projecting lugs G', between which is located a cam D', having a sleeve E' mounted on a stud F, fixed in the spider C. A lever M' is journaled on the sleeve E' and operated by the arm N', fixed on the sleeve E, and having an adjusting-screw N'' engaging the lever M'. These levers M and M' extend inward and at opposite sides of the driving-shaft A and are forced outward by a sliding sleeve O on the shaft A, which sleeve is adjusted and held by any suitable means. (Not shown.) Said sleeve has a reduced middle portion O' and oppositely-inclined conical portions O'' and O''', whereby when it is moved so that the middle portion O' is opposite both of the levers both clutches will be released and when the sleeve is moved outward the lever M will be operated by its inner incline O''' and the inner clutch will drive the sleeve P and gears operated thereby. When the sleeve is moved inward, the outer incline O'' will in like manner operate the lever M', and thus drive the outer sleeve, together with the gears operated thereby, and when the sleeve O is moved inward a sufficient distance to bring both the levers M and M' opposite the large cylindrical portion O of the sleeve both of the clutches will be operated simultaneously. By applying the band-brake L the outer clutch and outer sleeve will be held from rotation, and by applying the brake L' the case will be held from rotating.

The operation of my device is as follows: By holding the case W stationary and engaging the inner clutch the driven member will be operated through the inner sleeve P, pinion P', and gears S, T, and V, which are so proportioned as to give the slowest forward speed required. By releasing the inner clutch and operating the outer clutch the motion will be through the outer sleeve Q, pinion Q', and gears R, T, and V, which may be so proportioned as to give a satisfactory intermediate speed without making the back-up speed too high. By operating both clutches simultaneously and releasing the case the entire device operates as a clutch connecting the shaft A with the driven member B and all parts of the device will rotate bodily about the axis of the said shaft and driven member. By driving with the inner clutch and applying the brake-band L, and thus holding the outer clutch member J stationary, the inner sleeve is rotated forward, which movement drives the case backward by means of the planet-gears S and R and the stationary pinion Q. At the same time the gears T and V tend to turn the driven member B forward relative to the case, but at a less speed than the backward movement of the case, the result being a slow backward movement of the driven member B. The intermediate forward speed being through the pinion Q' and gear R, any change of proportion of this gear and pinion whereby this speed is increased tends to decrease the backward movement of the case W when the same is driven backward, as described. Increasing the intermediate forward speed thus decreases the back-up speed, which can thus be made sufficiently low to be entirely satisfactory, which is impossible with the construction shown in the patent referred to if the intermediate speed is properly adjusted. Furthermore, by the arrangement described whenever both clutches are released to wholly disconnect the driving and driven members the gears are also disconnected from the driving-shaft and are not rotated thereby.

Having thus fully described my invention, what I claim, and desire to secure by Letters Patent, is—

1. The combination of a driven gear, a series of independently-rotative driving-pinions, means for separately actuating the pinions, means for simultaneously actuating the same, a series of planet-gears rigidly connected to each other, and severally engaging the driven gear and the pinions, and means for holding the axis of the planet-gears stationary when actuating one of the pinions, and releasing the same when simultaneously actuating the pinions.

2. The combination of a driven gear, a series of independently-rotative driving-pinions, means for separately actuating the pinions, means for simultaneously actuating the pinions, a series of planet-gears rigidly connected to each other and severally engaging the driven gear and the pinions, means for temporarily holding the axis of the planet-gears stationary, and means for temporarily holding one of the pinions from rotating.

3. The combination of a driven gear, three planet-gears rigidly attached to each other, two independently-rotative driving-pinions, a driving-shaft, a clutch connecting each driving-pinion to the said shaft, means for operating each clutch separately, means for operating both clutches simultaneously, means for holding one of the driving-gears from rotating and means for holding the axis of the planet-gears stationary.

4. The combination of a driven gear, three planet-gears rigidly connected to each other, two independently-rotative sleeves, a pinion and a clutch member on each sleeve, a driving-shaft, two clutch members on the said shaft and engaging the respective clutch members on the sleeves, means for operating either clutch separately, means for operating both clutch members simultaneously and means for temporarily holding the axis of the planet-gears stationary.

5. The combination of a driven gear, three planet-gears rigidly connected to each other, two independently-rotative sleeves, a pinion and a cup-shaped clutch member fixed on each sleeve, a driving-shaft, a spider on the shaft, two friction-clutch members on the spider, levers to operate the said clutch members, a sleeve having a reduced middle portion and oppositely-inclined conical portions to engage the levers, and means for holding the axis of the planet-gears stationary.

6. The combination of a driven gear, three rigidly-connected planet-gears, two independently-rotative sleeves, a pinion and a cup-shaped clutch member on each sleeve, a driving-shaft, a spider on said shaft, two expansion-rings mounted on the spider and engaging the respective clutch members, cams engaging the rings, levers to operate the cams a sleeve having a reduced middle portion to release both levers, and conical portions to alternately operate the levers, and means for temporarily holding the axis of the planet-gears stationary.

7. The combination of a driven gear, a case rotative about the axis of said gear, a brake to hold the case from rotating, a series of planet-gears rigidly attached to each other and mounted in the case, a series of independently-rotative sleeves, a pinion and a cup-shaped clutch member fixed on each sleeve, a driving-shaft, a spider on said shaft, expansion-rings attached to the spider at one side, and divided at the other side and provided with parallel jaws, rotative cams between the jaws, levers connected to the cams, a sleeve slidable on the said shaft and having a reduced portion to release the levers, and inclined portions to alternately operate the levers, and means for holding one of the clutch members from rotating.

8. The combination of independently-rotative sleeves, a pinion and a clutch member on each sleeve, a driving-shaft, clutch members on the driving-shaft and engaging the respective clutch members on the sleeves, means for simultaneously engaging and releasing said clutch members, means for alternately engaging the same, means for holding one of the driven clutch members from turning, sun and planet gears operated by the pinions, and means for holding the axis of the planet-gears from rotating.

9. The combination of a driving-shaft, a driven member, a gear on the driven member, a case rotative about the axis of said gear, a series of planet-gears rigidly attached to each other and mounted in the case, means for holding the case from rotating, independently-rotative sleeves, a pinion and a clutch member fixed on each sleeve, a brake-band to hold the outer clutch member from turning, a spider on the driving-shaft, expansion-rings on the spider and engaging the respective clutch-members, cams to operate the rings, levers to operate the cams, a sleeve slidable on the driving-shaft and having a reduced portion to release the levers, and oppositely-inclined portions to alternately engage and operate the levers.

10. The combination of independently-rotative driving-pinions, a driving-shaft, a clutch to separately connect the respective pinions and the driving-shaft, means for simultaneously engaging or releasing the clutches, means for alternately engaging the clutches, sun and planet gears driven by the pinions, means for holding the axis of the planet-gears stationary, and means for holding one of the pinions from rotating.

11. In combination with sun and planet gears, and means for temporarily holding the axis of the planet-gears stationary, independently-rotative driving-pinions engaging the respective planet-gears, concentric cup-shaped clutch members connected to the respective pinions, the outer member projecting beyond the inner one, a brake engaging the outer member to hold the same, a driving-shaft, a spider on said shaft, expansion-rings mounted on the spider and engaging the respective clutch members, said rings being pivoted to the spider at one side, and divided at the other side, rotative cams between the divided ends of the rings, levers to operate the cams, and a sleeve slidable on the shaft and having a reduced portion to release the levers, and inclined portions to alternately operate the levers.

12. In combination with sun and planet gearing, independently-rotative pinions adapted to rotate said gearing at different rates, a driving-shaft, a clutch to connect each pinion with said shaft, means for simultaneously releasing the clutches, means for simultaneously engaging the clutches, means for alternately engaging the clutches, means for holding one of the pinions from rotating, and means for holding the planet-gears from rotating about the sun-gear.

In testimony whereof I affix my signature in presence of two witnesses.

WALTER S. AUSTIN.

Witnesses:
LUTHER V. MOULTON,
GEORGIANA CHACE.